United States Patent [19]

Arbeiter et al.

[11] Patent Number: 5,666,859
[45] Date of Patent: Sep. 16, 1997

[54] LATCHING SHIFTER FOR A BICYCLE TRANSMISSION

[75] Inventors: Markus Arbeiter, Würzburg; Klaus Neumann, Niederwerrn, both of Germany

[73] Assignee: Fichtel & Sachs AG, Schweinfurt, Germany

[21] Appl. No.: 566,284

[22] Filed: Dec. 1, 1995

Related U.S. Application Data

[60] Provisional application No. 60/004,006 Sep. 20, 1995, and 60/004,002 Sep. 20, 1995.

[30] Foreign Application Priority Data

Dec. 2, 1994 [DE] Germany .............. 44 42 953.3
Apr. 29, 1995 [DE] Germany ............. 295 07 220.2

[51] Int. Cl.⁶ ............................................... B62M 25/04
[52] U.S. Cl. .............................. 74/489; 74/502.2; 74/527
[58] Field of Search .................... 74/475, 489, 502.2, 74/527

[56] References Cited

U.S. PATENT DOCUMENTS

| | | |
|---|---|---|
| D. 269,850 | 7/1983 | Preisler et al. . |
| D. 298,309 | 11/1988 | Coue . |
| D. 299,333 | 1/1989 | Coue . |
| D. 324,634 | 3/1992 | Chen . |
| D. 351,776 | 10/1994 | Schuchard et al. . |
| 5,134,897 | 8/1992 | Romano ............................... 74/489 |
| 5,197,927 | 3/1993 | Patterson et al. . |
| 5,241,877 | 9/1993 | Chen ..................................... 74/489 |
| 5,315,891 | 5/1994 | Tagawa ................................. 74/489 |
| 5,390,565 | 2/1995 | Tagawa et al. ...................... 74/502.2 |
| 5,421,219 | 6/1995 | Tagawa et al. ...................... 74/502.2 |
| 5,476,019 | 12/1995 | Cheever et al. ..................... 74/475 X |
| 5,503,598 | 4/1996 | Neuer et al. . |
| 5,522,611 | 6/1996 | Schmidt et al. . |
| 5,588,925 | 12/1996 | Arbeiter et al. .................. 74/502.2 X |

FOREIGN PATENT DOCUMENTS

| | | |
|---|---|---|
| 2540818 | 8/1984 | France . |
| 3215426 | 10/1983 | Germany . |
| 8504060 | 12/1985 | Germany . |
| 3823741 | 1/1989 | Germany . |
| 29502403 | 6/1995 | Germany . |
| 0180484 | 8/1962 | Sweden . |
| 9318960 | 9/1993 | WIPO . |
| 9318961 | 9/1993 | WIPO . |
| 9319977 | 10/1993 | WIPO . |

*Primary Examiner*—Charles A. Marmor
*Assistant Examiner*—Troy Grabow
*Attorney, Agent, or Firm*—Nils H. Ljungman and Associates

[57] ABSTRACT

This invention relates to a latching shifter for bicycle transmissions, such as hub transmissions or derailleurs, with a housing, a latch element with notches, a latching spring with a latching lug and two projections, as well as a slide with different bias stages which interact with the projections of the latching spring. By changing the position of the slide, the projections of the latching spring are brought together with different bias stages of the slide, whereupon the latching spring is pressed with varying degrees of pressure by means of its latching lug into the notches of the latching element. The advantage of the externally adjustable bias is that the shifter can be individually adjusted in terms of the retention force which prevents unintentional shifting when the bicycle is in motion.

11 Claims, 3 Drawing Sheets

LATCHING SHIFTER FOR A BICYCLE TRANSMISSION

This application claims the benefit of U.S. Provisional Application No. 60/004,006, filed Sep. 20, 1995. This Application further claims the benefit of U.S. Provisional application No. 60/004,002, filed on Sep. 20, 1995.

BACKGROUND OF THE INVENTION

1. Field of the Invention

The present invention generally relates to a latching shifter for the actuation of bicycle transmissions, such as hub transmissions or derailleurs. The latching shifter includes a housing and a latching element, which latching element has notches. The latching shifter further includes a latching spring, which latching spring has at least one latching lug. The latching spring also has two projections, which projections are located opposite the latching lug, viewed in the direction of the transmission of force, The latching shifter includes a recess for the latching Spring and stop surfaces located on the housing.

2. Background Information

French Patent No. 25 40 818 discloses a latching shifter which, as shown in that publication's FIG. 7, has a biased latching spring with a latching lug which is engaged with bias in a profile of the latching element. This bias is constant and is a function of the level of the recess in the housing of this shifter in which the latching spring rests to generate the bias by means of two clip-like or bracket-like ends. The arrangement operates, as shown in the publication's FIGS. 6 or 9, to generate sound, whereby in this case, the bias is constant.

The object of the present invention, on the other hand, in particular, with twist grip shifters, is to advantageously increase or decrease the latching of the latching spring with the latching element by increasing or decreasing the bias. The rider can thereby individually select a shifting force which can be to suit the rider's own requirements regarding the relationship between the shifting force which must be exerted and the retention force of the latching. Unintentional shifts can be prevented, if the rider can adjust the retention force of the latching of the latching shifter so that the manual actuator on the latching shifter can stop rotating just as it enters the new gear.

OBJECT OF THE INVENTION

The object of the present invention is therefore to create a shifter for bicycle transmissions, the latching of which shifter, in relation to the retention force of the shifter, can be individually adjusted by modifying the bias of the parts which are to be latched with one another.

SUMMARY OF THE INVENTION

The present invention teaches that this object can be achieved by designing the latching spring to interact with a slide or bar, to generate a bias of the latching lug in the notches of the latching element. The two projections can thereby be biased at different levels by selectively changing the position of the slide from a first bias area, which first bias area can include a first level, or to a second bias area, which second bias area can include a second level, or to a third bias area, which third bias area can include a third level, etc.

In accordance with an embodiment of the present invention, the bias areas can be designed, in terms of the width of the bias areas, such that a displacement of the latching spring can be possible by the order of magnitude of a transition distance. The transition distance can be specified by the latching spring and a stop surface essentially without changing the level.

In accordance with another embodiment of the present invention, the slide can permit a continuous change of the level of the projections by means of an inclined plane, which inclined plane can correspond to each of the bias areas.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The present invention is explained in greater detail below with reference to the accompanying drawings, in which:

FIG. 9 shows a perspective view of a twist grip shifter with a grip part fixed to the handlebar, and a rotational grip part.

DESCRIPTION OF THE PREFERRED EMBODIMENT

Figure 1:
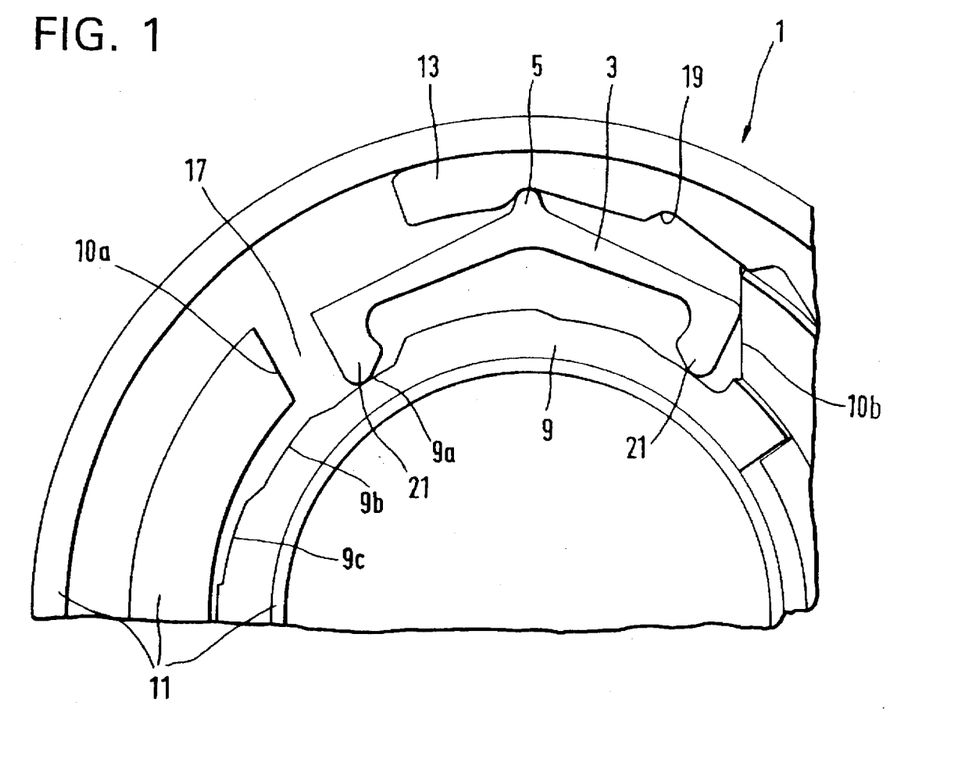
FIG. 1 shows a portion of a latching shifter with a housing, a latching element, a latching spring and a slide, with several bias stages.

One embodiment of the present invention, as shown in FIG. 1, includes a detent or latching shifter 1 which can be, in particular, a twist grip shifter for the actuation of bicycle transmissions, such as hub transmissions or derailleurs. The latching shifter 1 can include a housing 11 and a detent or latching element 13, which latching element 13 can have detents or notches 19. The latching shifter 1 can also include a detent or latching spring 3. The latching spring 3 can preferably include a detent or latching lug 5 and two projections 21. The latching spring 3 can also have a slide 9 with various bias stages 9a, 9b, 9c etc. The bias stages 9a, 9b, 9c etc. can interact with the projections 21 of the latching spring 3.

The housing 11 can preferably be non-rotationally connected to the handlebar of the bicycle in the vicinity of the grip part. On the orbit of the latching spring 3, there can preferably be a recess, which recess can be formed by the stop surfaces 10a and 10b. In other words, there is a recess in a circumferential portion of the housing 11 that is limited on one end by stop surface 10a and on the other end by stop surface 10b. The latching spring 3 can be located in this recess. The latching spring 3 can be in contact with the one stop surface 10a by means of the spring force generated by the bicycle transmission. Between the latching spring 3 and the other stop surface 10b, there can be a clearance, which clearance can represent a transition distance 17, whereby the position of the latching spring 3 in its rest position can be defined.

In accordance with one embodiment of the present invention, therefore, the housing 11 can preferably be attached to the handlebar such that the housing 11 cannot rotate with respect to the area of the grip part of the handlebar. The latching spring 3 can preferably be located within the recess, which recess can include a space essentially between the stop surface 10a and the stop surface 10b. The latching spring 3 can orbit or move within this recess. One side of the latching spring 3 can preferably be biased against the stop surface 10b. The other end of the latch spring 3, which other end can face away from the stop surface 10b, can face toward the stop surface 10a. The transition distance 17 can thereby include the space or clearance between the end of the latch spring 3 and the stop surface 10a. The amount of clearance of the transition distance 17 can remain essentially constant when the latch spring 3 is in a rest position.

The recess in the housing 11 can be crossed or overrun by the latching element 13, which latching element 13 can preferably be connected to the rotational portion of the twist grip shifter. The latching element 13 can have several notches 19 facing the latching lug 5, as mentioned above, whereby a latching can occur when the latching lug 5 is essentially pressed with bias into the notches 19. This bias can be generated by the latching spring 3, which latching spring 3 can rest, by means of the two projections 21, on the slide 9. The slide 9 has the different bias stages 9a, 9b, 9c etc., each of which bias stages 9a, 9b, 9c etc. can lie on a different level with regard to the projections 21. The bias stages 9a, 9b, 9c etc. can be displaced in pairs, one after another, under the two projections 21, by changing the position of the slide 9.

Therefore, in accordance with one embodiment of the present invention, the latching element 13 can be located along the outer portion of the recess, with reference to FIG. 1. The latching element 13 can rotate with respect to the rotational portion of the twist grip shifter. The latching element 13 can have several notches 19, which notches 19 can receive the latching lug 5 to thereby bias the latching spring 3 essentially between the latching element 13 and the slide 9. The latching spring 3 can include a pair of projections 21. The two projections 21 can simultaneously be displaced back and forth among the different bias stages 9a, 9b, and 9c etc. of the slide 9 by means of the rotation of the slide 9 in a clockwise or a counterclockwise direction with respect to FIG. 1.

Figure 2:
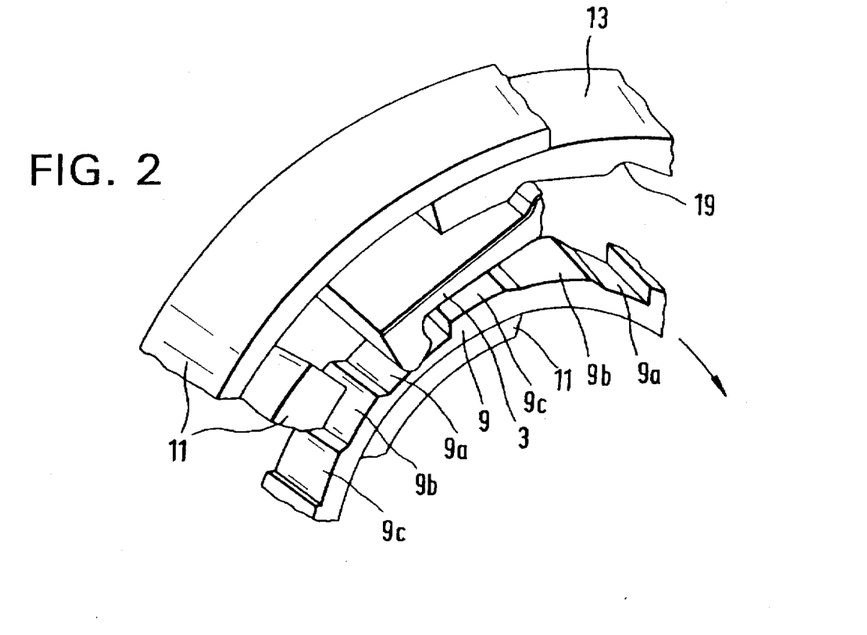
FIG. 2 shows a view in perspective of the portion of the latching shifter illustrated in FIG. 1, with a more detailed illustration of the slide.

In the position illustrated in FIGS. 1 and 2, the projections 21 of the latching spring 3 can each be considered to be on the bias stages 9a of the slide 9. In this position, the least bias is applied to the latching spring 3, which means that the latching element 13 can be pushed or pulled most easily from the retention position in the notch 19. If the slide 9 is rotated in the clockwise direction with respect to FIGS. 1 and 2, the projections 21 can be moved to the higher level of the subsequent bias stage 9b. As a result, the latching spring 3 can be essentially more strongly biased by the difference in level between the bias stages 9a and 9b, with the result that the latching spring 3 can develop a higher resistance against a rotational force. The retention force of the latching spring 3, when the bias stage 9c is subsequently moved under the projections 21 of the latching spring 3, can change accordingly.

Therefore, in accordance with one embodiment of the present invention, when the two projections 21 are on the respective bias stages 9a, as shown in FIGS. 1 and 2, the least amount of biasing force can be applied to the latching spring 3. When the slide 9 is rotated in the clockwise direction, however, the two projections 21 can be biased against the respective bias stages 9b. As a result, because of the difference of levels between bias stages 9a and bias stages 9b, the latching spring 3 can thereby be more strongly biased between the latching element 13 and the slide 9. Similarly, when the slide 9 is further rotated in the clockwise direction, the two projections 21 can be biased against the respective bias stages 9c. As a result, because of the difference of levels between bias stages 9b and bias stages 9c, the latching spring 3 can thereby be even more strongly biased between the latching element 13 and the slide 9. When the rotation of the slide 9 successively displaces the two projections 21 from the biasing stages 9a, to the biasing stages 9b, and then to the biasing stages 9c, etc., the bias of the latching spring 3 between the latching element 13 and the slide 9 can accordingly provide a greater resistance to the force of rotation.

The bias stages 9a, 9b, 9c etc. can be selected so that the peripheral extensions of each of the bias stages 9a, 9b, 9c etc. can be large enough that the latching spring 3 can be displaced by the peripheral length of the transition distance 17, without the projections 21 leaving the respective bias stage 9a or 9b or 9c etc. In other words, the circumferential length of the bias stages 9a, 9b, and 9c can be at least the length of the transition distance 17. Therefore, the latching spring 3 can move throughout the transition distance 17 without the projections 21 being displaced to another of the bias stages.

In summary, and in accordance with one embodiment of the present invention, to essentially prevent the projections 21 from being displaced from the corresponding bias stages 9a, 9b, or 9c etc., the length of each of the bias stages 9a, 9b, and 9c etc. can be sized with respect to the length of the transition distance 17, such that the length of the bias stages 9a, 9b, and 9c etc. can preferably be relatively longer than the length of the transition distance 17. As a result, if the latching spring 3 essentially travels toward and along the transition distance 17, the projections 21 of the latching spring 3 can be prevented from leaving the corresponding pair of biasing stages 9a, 9b, or 9c etc. because the longer lengths of each of the biasing stages 9a, 9b, and 9c etc. can thereby compensate for the travel of the latching spring 3 along the shorter length of the transition distance 17.

Figure 3:
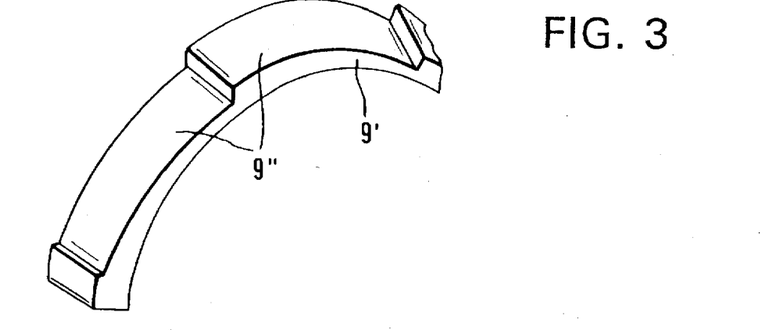
FIG. 3 shows a variant of the slide with the capability of continuously adjusting the bias of the latching spring.

FIG. 3 shows a slide 9' with contact surfaces 9", which contact surfaces 9" no longer include different bias stages. Each of the contact surfaces 9" can, however, include an inclined plane with a low angle of inclination, which has the special advantage that it can permit a continuous adjustment of the bias between the latching spring 3 and the latching element 13.

Therefore, in accordance with one embodiment of the present invention, as shown in FIG. 3, each contact surface 9" of the slide 9' can include an arc-shaped or inclined surface. As a result, the height of one end of the contact surface 9" can be relatively shorter than the height of the other end of the contact surface 9" such that the height of the areas between the ends can thereby form an inclined plane of the contact surface 9". By realizing the contact surface 9"in the form of an arc-shaped or inclined plane, the bias of the latching spring 3 can be essentially continuously adjusted upon rotation of the slide 9'.

In general, with regard to the mode of operation of the latching shifter 1, it should be understood that the shifting motions can take place essentially exclusively by means of the latching element 13, since the latching element 13 can be connected on one hand directly to the twist grip, which twist grip can be actuated by the rider. And, on the other hand, the latching element 13 can be connected with the one end of a control wire of a Bowden cable, and the other end of the Bowden cable can be located on the adjustment mechanism of the derailleur, in which case the mechanism described here can change only the shifting resistance, in the order of the gears selected, with the ability to produce a stop in each gear, after the latching of the latching lug 5 in one of the notches 19 with the selective bias.

In accordance with one embodiment of the present invention, therefore, the latching shifter 1 can operate by means of the motion of the latching element 13 since one end of the latching element 13 can be connected to the twist grip actuated by the rider. The latching element 13 can also be connected with one end of the Bowden cable, whereby the other end of the Bowden cable can preferably be connected to the derailleur to thereby adjust the shift resistance of the gears of the derailleur.

One feature of the invention resides broadly in the latching or notching shifter 1 for a bicycle transmission, comprising a housing 11, a latching element 13 with notches 19, a latching spring 3 with at least one latching lug 5, two projections 21 which are located opposite the latching lug 5, viewed in the direction of the transmission of force, and a recess for the latching spring 3 with stop surfaces 10a and 10b on the housing 11, characterized by the fact that the latching spring 3 interacts with a slide 9 to generate a bias of the latching lug 5 in the notches 19 of the latching element 13, whereby each of the two projections 21 can be biased at different levels by the user selectively changing the position of the slide 9, via an attachment, the tang 30, that passes through the housing 11 and connects to a user operated control that can be readily accessible to the user, from a first bias area 9a with a first level, or a second bias area 9b with a second level, or a third bias area 9c with a third level, etc.

Another feature of the invention resides broadly in the latching shifter characterized by the fact that the bias areas 9a, 9b, 9c etc. are designed in terms of their width so that a displacement of the latching spring 3 is possible by the order of magnitude of a transition distance 17 specified by the latching spring 3 and stop surface 10b without changing the level.

Yet another feature of the invention resides broadly in the latching shifter characterized by the fact that the slide 9' makes possible a continuous change of the level of the projections 21 by means of an inclined plane 27 which corresponds to each of the bias areas 9a, 9b, 9c etc.

An invention relates to a shifter for the actuation of a derailleur on bicycles. French Patent No. 2 657 062 discloses a shifter for derailleurs which has a rotating ring 44 with a cable suspension 43 and grip ends 50 as well as a housing 22 fastened to the handlebar with notches for a spring ring 28 which interacts by means of lugs 26 with notches 46 in the rotating ring 44. This spring ring 28 is realized in one piece as shown in FIG. 2 and in two parts as shown in FIG. 4, whereby one of the parts is the detent spring 29, which can be rotated by a small circular distance relative to the second ring part 29'. This relative rotational capability, as disclosed in claim 6, makes it possible to increase the shifting travel from one detent to the next, against the spring force of the derailleur, by just this small relative rotation, whereby a transition travel is produced which, when the chain is shifted from a smaller sprocket to the next larger sprocket, can be used as before to significantly improve the shifting quality.

An improvement could be made by introducing a transition spring which would be installed as a compression spring in the transition space between the detent spring and the second ring part or the housing. The advantage would lie in a defined position of the detent spring in the idle position of the shifting system and in the precision of shifting which could be achieved after shifting from the smaller to the next larger sprocket by the momentary neutralization of the transitional condition.

The object of an invention is therefore to create a device which makes it possible, immediately after the completion of the shifting actuation, to end the transitional state and to return the derailleur to its correct position above the selected sprocket.

Figure 4:
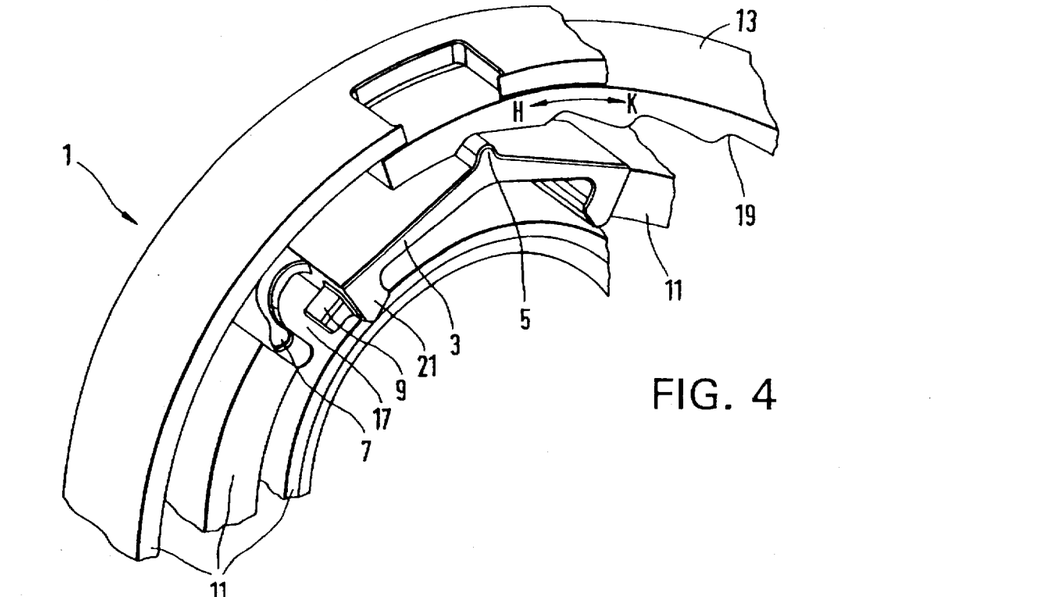
FIG. 4 shows a view in perspective of a shifter with a housing, a detent element and a detent spring with a transition spring.

One embodiment of an invention, as shown in FIG. 4, includes a latching or detent shifter for the actuation of a derailleur K. This detent shifter consists of a housing 11 which can be permanently connected or connected in a non-rotational manner to a part of a bicycle, a detent element 13 which is movably located inside this housing 11 and which is connected, possibly by means of a cable, on one hand to a manual actuator (designated H for direction indication in the figure) and on the other hand to the derailleur(designated K for direction indication in the figure) to be shifted to change the gear on the bicycle. The embodiment illustrated in FIG. 4 shows the gripper part of a twist-grip shifter located around a handlebar, the manual actuator H which is connected to the detent element 13. The detent element 13 is also connected to the first end of a control cable of a Bowden cable, while the second end of the control cable is connected to the derailleur K (see FIG. 5). The detent element 13 has detents 19 in which a lug 5 of a detent spring 3 is engaged. In this case, the detent spring 3 is in a stirrup-shape, and is supported by means of two projections 21 on the housing 11, by means of which the lug 5 is biased with respect to the detent element 13.

Figure 6:
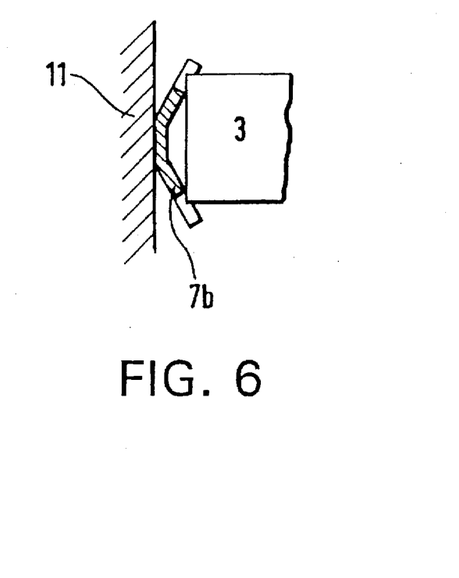
FIG. 6 illustrates a variant in which the transition spring is realized in the form of a plate spring.
Figure 7:
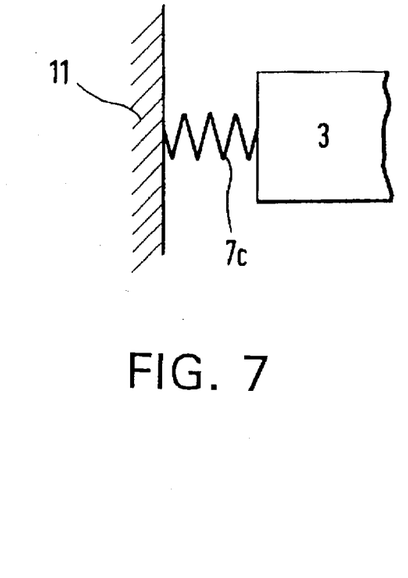
FIG. 7 illustrates an additional variant of the transition spring, in which it is realized in the form of a coil spring.

The detent spring 3 lies in a recess in a circumferential portion in the housing 11 (see FIG. 1), by means of which the detent spring 3 is fixed in position in the circumferential direction. This fixing includes some additional play, namely the transition distance 17, within which the detent spring 3 can move back and forth in the circumferential direction. To orient the detent spring 3 on a particular side, namely on the side facing the manual actuator H, there is a transition spring 7 which can preferably be connected in one piece with the detent spring 3, but which transition spring 7 can also be in the form of a spring plate 7b (FIG. 6), or as a separate transition spring in the form of a coil spring 7c (FIG. 7). There can also be a stop 10 which correctly limits the travel of the transition spring 7 and defines the transition distance 17.

Figure 8:
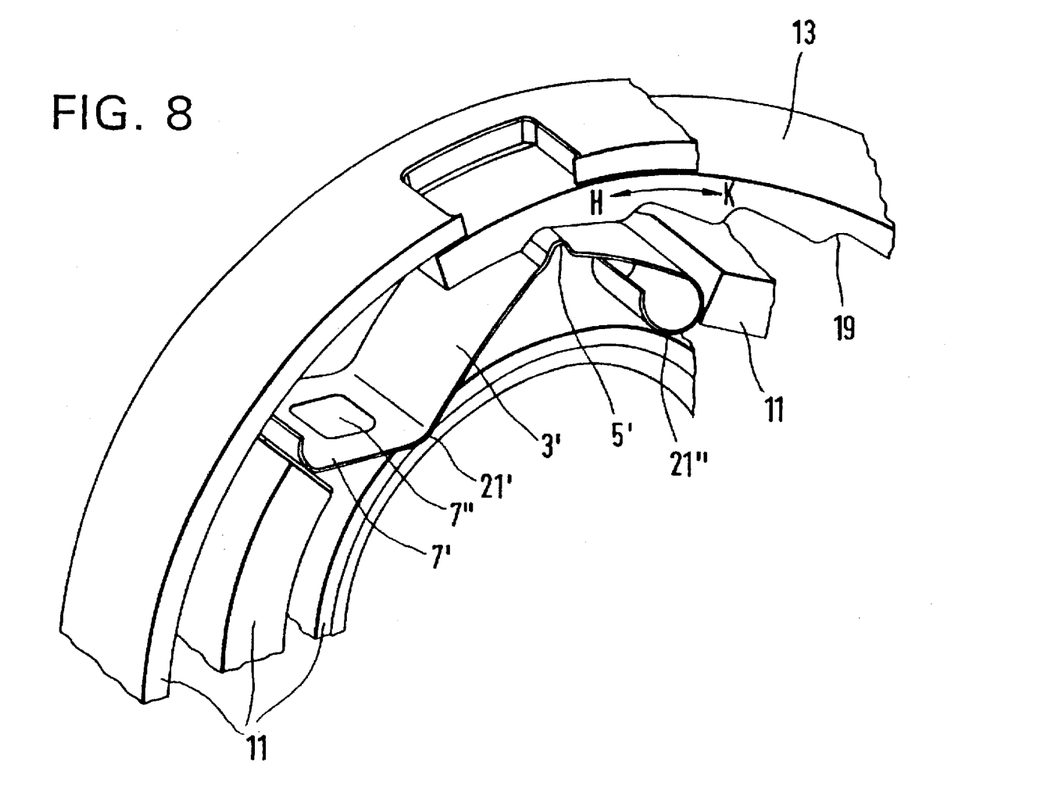
FIG. 8 shows a view in perspective as in FIG. 4 with a detent spring made of steel band material and an integrated transition spring.

FIG. 8 shows a detent spring 3' which is also in the shape of a stirrup and includes a leaf spring made of steel band material. This detent spring 3' also has a lug 5' to increase a retaining force with respect to the detents 19 in the detent element 13, which force results from a bias which is generated by two projections 21' and 21", which projections 21' and 21" are supported on the housing 11. At the projection 21', the detent spring 3' can be connected in one piece to a transition spring 7', which transition spring 7' can be applied against the flank on the housing 11. To increase the flexibility of the transition spring 7', notches 7" can be created which reduce the thickness of the band material in certain places and make possible a softer spring constant than the regular thickness of the band material of which the detent spring 3' is made.

Figure 5:
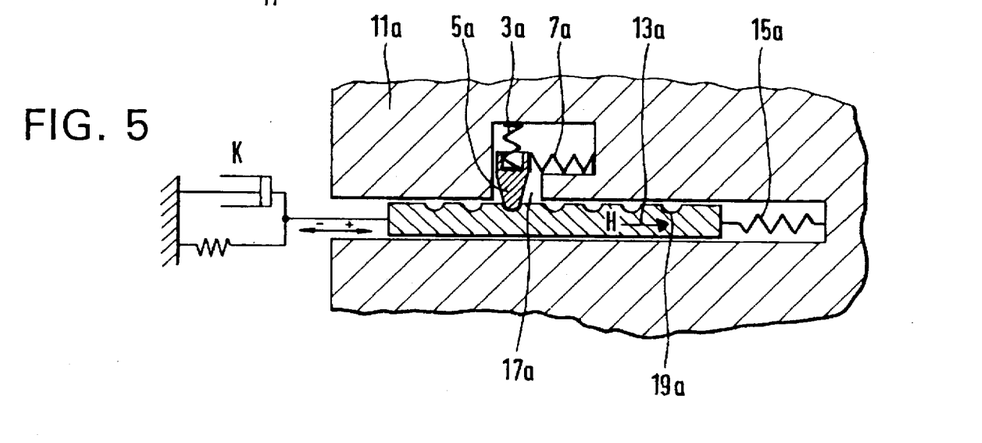
FIG. 5 shows a schematic illustration of the elements which participate in the shifting action.

FIG. 5 is a schematic diagram which illustrates the function of the detent shifter 1. By analogy to FIG. 4, the parts shown in FIG. 5 are identified by the same numbers plus the letter "a".

If the detent element 13a in the housing 11a is pulled by the manual actuator H toward the manual actuator H, the chain is to be shifted from a smaller sprocket to the next larger sprocket. On account of the lower tendency of the chain to ascend in this direction of shifting, the desired position of the derailleur K is overshot by the transition distance 17a, as a result of which the angle of ascent of the chain with respect to the larger sprocket increases and the shifting takes place. With the current quality of the shifting elements of derailleurs, it is sufficient to hold this transition position only for a very brief time, which means that the user need only shift to the next resistance, and then let go. Without noticing or even intending to do so, the rider has used the transition distance 17a.

As shown in FIG. 5, the detent element 13a can be connected to the housing 11a by means of a compensation spring 15a, which has the advantage that the shifting motion toward the next larger sprocket is made easier, since the compensation spring 15a, acting as a tension spring, counteracts the spring force of the parallelogram of the derailleur K. Also, the compensation spring 15a can be eliminated, since the process of shifting between the detent element 13a and the detent spring. 3ais not directly affected. If the detent element 13a is then moved further toward the manual actuator H, first the transition spring 7a is pressed together by the detent lug 5a and the transition distance 17a is reduced by the detent lug 5a to the detent spring 3a. Essentially only then does the detent lug 5ajump out of the respective detent 19a and slide into the next detent 19a, whereby the position of the detent lug 5a on the detent spring 3a does not change. Only after the manual actuator H is released does the transition spring 7a, in connection with the return spring in the derailleur K, bring the detent element 13a back into the desired correct shifting position.

In other words, in accordance with one embodiment of an invention, when the manual actuator H pulls the detent element 13a, the detent lug 5a compresses the transition spring 7a. When the detent lug 5a fully reduces the transition distance 17a, the detent lug 5a rises out of the current detent 19a and slides into the next detent 19a. The rising of detent lug 5a compresses the detent spring 3a. The force of the detent spring 3a pushes the detent lug 5a into the next detent 19a. After the manual actuator H is released, the force of the transition spring 7a, along with effect of the return spring in the derailleur K, brings the detent element 13a back into the desired correct position wherein the derailleur K is aligned with the chain over the newly selected gear.

In accordance with one embodiment of an invention, one feature of an invention resides broadly in the shifter for a derailleur for bicycles, comprising a housing 11, a detent element 13 which is connected both to the manual actuator H and to the derailleur K, as well as a detent spring 3 made of elastic plastic material, the lug 5 of which interacts with detents 19 of the detent element 13 and can have a transition distance 17 between the housing 11 and the detent spring 3, characterized by the fact that the detent spring 3 is located in a recess of the housing 11, whereby also located in the recess, in addition to the detent spring 3, located downstream in the direction of movement toward the manual actuator H, is a transition spring 7 which can apply a bias between the housing 11 and the detent spring 3 and can be compressed into a block.

In accordance with one embodiment of an invention, another feature of an invention resides broadly in the shifter characterized by the fact that the spring travel of the transition spring 7 corresponds to the specified transition distance on the derailleur K.

In accordance with one embodiment of an invention, yet another feature of an invention resides broadly in the shifter characterized by the fact that the transition spring 7 is connected in one piece with the detent spring 3.

In accordance with one embodiment of an invention, still another feature of an invention resides broadly in the shifter characterized by the fact that the detent spring 3 has a stop 10 which limits the transition distance 17 by interaction with the transition spring 7.

In accordance with one embodiment of an invention, a further feature of an invention resides broadly in the shifter characterized by the fact that the transition spring 7b is realized in the form of a plate spring.

In accordance with one embodiment of an invention, another feature of an invention resides broadly in the shifter characterized by the fact that the transition spring 7c is realized in the form Of a coil spring.

In accordance with one embodiment of an invention, yet another feature of an invention resides broadly in the shifter for a derailleur for bicycles, comprising a housing 11, a detent element 13 which is connected both to the manual actuator H and to the derailleur K, as well as a detent spring 3', the lug 5' of which interacts with detents 19 of the detent element 13 and can have a transition distance 17 between the housing 11 and the detent spring 3', characterized by the fact that the detent spring 3' is located in a recess of the housing 11, whereby also located in the recess, downstream of the detent spring 3' in the direction of movement toward the manual actuator, there is a transition spring 7' which is connected in one piece with the detent spring 3', and which can apply a bias between the housing 11 and the detent spring 3'.

Still another feature of an invention resides broadly in the shifter characterized by the fact that the detent spring 3 is made of steel band material.

An invention generally relates to a twist grip shifter for the control of the gears of transmissions of bicycles. The twist grip shifter includes a connection for an actuator cable, a cable inlet segment, and a winding drum in a cable windup or spooling segment. The twist grip shifter further includes a grip part fixed to the handlebar and another grip part rotationally connected to the winding drum.

German Laid Open Patent Application No. 32 15 427 discloses a twist grip shifter which has a grip part fixed to the handlebar and a rotational grip part, the diameter of which rotational grip part is significantly larger than the diameter of the grip part which is fixed to the handlebar, thereby making it possible for the rider to control the shifting of the gears with little expenditure of effort. To shift gears, the bicyclist must use the large diameter of the rotating part of the grip to shift gears, both when upshifting and when downshifting. When upshifting, in most cases the cable is only released, which means that large shifting forces are not necessary. But when downshifting and when a traction force must be exerted on the cable, different amounts of force are necessary, since the cable must be pulled against the force of a return spring in the transmission of the bicycle. Conventional related devices effectively solve the problem of pulling the cable against the action of the transmission spring, but there is generally no teaching on the release of the cable.

An invention can improve the conventional design. To release the cable, an additional area with a small diameter can preferably be molded onto the rotating part of the grip. The diameter of the rotating part of the grip can thereby essentially differ only slightly from the diameter of the part of the grip that can be fixed to the handlebar. Such a stepped realization of the rotating part of the grip can therefore permit the actuation of the cable, which cable can extend to the bicycle transmission, with relatively little expenditure of effort in both directions. The release of the cable can thereby take place by using the area with the small diameter, and the cable can be reeled in by means of the area of the rotational part of the grip with the large diameter.

One object is to create a twist grip shifter by means of which it is possible to reel in the cable and to overcome relatively high actuation forces by means of an area with a large diameter, and the release of the cable can take place by means of an area with a small diameter, whereby it can be possible to achieve precisely the combination of advantages described above.

This object can be accomplished by designing the contour of a rotational grip part in a stepped fashion such that the rotational grip part can have an area with a large diameter and an area with a small diameter. The area with the large diameter can preferably be located adjacent to a cable windup segment and the area with the small diameter can preferably be directed toward a grip part, which grip part can be fixed to the handlebar. In addition, the area with the small diameter can have a diameter which differs only slightly from that of the grip part.

In accordance with one embodiment, the surface of the non-rotational or fixed grip part can have a first, nondirectionally-structured surface profile for the purpose of ventilation.

In yet another embodiment, the surface of the rotational grip part can preferably have a directional surface profile both in the vicinity of the large diameter and in the vicinity of the small diameter for the transmission of torque.

The area with the small diameter of the rotational grip part can vary slightly, resulting in a rotationally symmetrical shape which can be different from a cylindrical shape.

In an additional advantageous feature, the rotational grip part can have a conical shape in the vicinity of the small diameter. The rotational grip part can have its smallest diameter at the point of transition from the area with the small diameter to the area with the large diameter.

In another embodiment, at the end of the handlebar, the grip part fixed to the handlebar can have a ring-shaped bead. The shape of the ring-shaped bead can preferably be identical, in terms of diameter, shape and surface structure, to the area of the rotational grip part with the large diameter.

One embodiment of an invention, as shown in FIG. 9, includes a twist grip shifter with a connection for an actuator cable 101 and a cable inlet segment 102. The twist grip shifter can have a cable windup segment 103, which cable windup segment 103 can include a winding drum to wind up the actuator cable. The twist grip shifter can further include a grip part 104, Which grip part 104 can be fixed to the handlebar. In addition, the twist grip shifter can include a rotational grip part 105, which rotational grip part 105 can preferably be located directly adjacent to the cable windup segment 103. The rotational grip part 105 can preferably lie between the cable windup segment 103 and the grip part 104 fixed to the handlebar.

The rotating grip part 105 can have an area with a large diameter D1 and an area with a small diameter D2. The area with the large diameter D1 of the rotational grip part 105 can be adjacent to the cable windup segment 103, and the area with the small diameter D2 can be adjacent to the grip part 104 fixed to the handlebar. The diameters on one hand of the area with the large diameter D1 and of the cable windup segment 103, and on the other hand of the grip part 104 which can be fixed to the handlebar and of the area with the small diameter D2, can be essentially approximately equal to one another.

Examples of bicycle shifting mechanisms which may be utilized in accordance with the embodiments of the present invention, may be disclosed in the following U.S. Pat. Nos.: 4,900,291, which issued to Patterson on Feb. 13, 1990, entitled "Bicycle Gear Shifting Method and Apparatus"; 4,938,733, which issued to Patterson on Jul. 03, 1990, entitled "Bicycle Gear Shifting Method and Apparatus"; 5,009,629, which issued to Tagawa on Apr. 23, 1991, entitled "Shift Lever Assembly for Bicycle"; 5,102,372, which issued to Patterson et al on Apr. 07, 1992, entitled "Bicycle Derailleur Cable Actuating System"; 5,135,441, which issued to Gelbien on Aug. 04, 1992, entitled "Shifting Apparatus for Multispeed Bicycles"; 5,178,033, which issued to Kund on Jan. 12, 1993, entitled "Bicycle Gear Display"; 5,186,071, which issued to Iwasaki on Feb. 16, 1993, entitled "Bicycle Speed Change Lever Assembly"; 5,186,072, which issued to Nagano on Feb. 16, 1993, entitled "Bicycle Speed Control System for Controlling a Change Speed Devise Through a Change Speed Wire"; 5,191,807, which issued to Hsu on Mar. 09, 1993, entitled "Indexed Gear-Shift Mechanism"; 5,197,927, which issued to Patterson et al on Mar. 30, 1993, entitled "Bicycle Derailleur Cable Actuating System"; 5,205,794, which issued to Browning on Apr. 27, 1993, entitled "Shift Mechanism for Bicycle"; 5,213,005, which issued to Nagano on May 25, 1993, entitled "Speed Control Devise for Bicycle Derailleur"; 5,241,878, which issued to Nagano on Sep. 07, 1993, entitled "Bicycle Control Devise"; 5,287,766, which issued to Nagano on Feb. 22, 1994, entitled "Speed Control Apparatus for a Bicycle"; 5,303,608, which issued to Iwasaki on Apr. 19, 1994, entitled "Bicycle Speed Change Lever Assembly"; 5,315,891, which issued to Tagawa on May 31, 1994, entitled "Bicycle Speed Change Operation Assembly"; 5,322,487, which issued to Nagano on Jun. 21, 1994, entitled "Self-Contained Change Speed Apparatus with Shaped Pawls to Equalize a Shifting Force for a Bicycle"; 5,325,735, which issued to Nagano on Jul. 05, 1994, entitled "Bicycle Speed Control Apparatus Having a Speed Indicator"; 5,354,240, which issued to Hunter, Jr. on Oct. 11, 1994, entitled "Variable Transmission"; 5,355,745, which issued to Wu and Hsuan on Oct. 18, 1994, entitled "Bicycle Speed Controller"; and 5,361,645, which issued to Feng and Kang on Nov. 08, 1994, entitled "Shift Lever Apparatus for Use in Bicycle".

Some examples of latching shifters which may be used in accordance with the embodiments of the present invention, may be disclosed in the following U.S. Pat. Nos.: 5,421,219 entitled "Bicycle Speed Change System, Bicycle Speed Change Method and Bicycle Speed Change Operation Assembly" to Maeda and Bridgestone; 5,390,565 entitled "Bicycle Speed Change System, Bicycle Speed Change Method and Bicycle Speed Change Operation Assembly" to Maeda and Bridgestone; 5,315,891 entitled "Bicycle Speed Change Operation Assembly" to Maeda; and 5,241,877 entitled "Gear Selector" issued Sep. 7, 1993.

Some examples of latching shifters which may be used in accordance with the embodiments of the present invention, may be disclosed in the following Federal Republic of Germany Patents: No. DE 32 15 426 A1 to Fichtel & Sachs and No. DE 38 23 741 A1 to Shimano.

An additional example of latching shifters which may be used in accordance with the embodiments of the present invention, may be found in French Patent No. 2 540 818.

Some examples of Twist grip shifters which may be used in accordance with the embodiments of the present invention, may be disclosed in the following U.S. Pat. Nos.: 3,218,879 entitled "Twist Grip Controls" to Raleigh; 5,134,897 entitled "Twist-grip Device for Operating the Gears of a Bicycle" to Campagnolo; 4,938,733 entitled "Bicycle Gear Shifting Method and Apparatus" to Sram Corporation; and 4,900,291 entitled "Bicycle Gear Shifting Method and Apparatus" to Sram Corporation.

Additional examples of Twist grip shifters and related components which may be used in accordance with the embodiments of the present invention, may be disclosed in the following Federal Republic of Germany Patents: No. DE 32 15 427 A1 to Fichtel & Sachs and NO. DE 37 27 933 A1 to Fichtel & Sachs.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 42 953.3, filed on Dec. 2, 1994, having inventor Markus Arbeiter, and DE-OS P 44 42 953.3 and DE-PS P 44 42 953.3, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A bicycle gear shifting system comprising:
    a rotatable shift actuator for operating gears of the bicycle;
    said rotatable shift actuator comprising:
        means for mounting said rotatable shift actuator on a bicycle handlebar generally coaxially with the handlebar;
        a housing;
        a latching spring;
        said latching spring comprising at least one latching lug;
        a latching element for receiving said at least one latching lug;
        said latching element comprising a plurality of detent notches;
        said latching element and said latching spring being rotatable with respect to each other;
        said at least one latching lug being disposed toward said detent notches;
    a slide;
        said slide being disposed to make contact with said latching spring;
        said slide comprising means for biasing said at least one latching lug of said latching spring against said detent notches;
        said means for biasing comprising means for adjusting the bias of said at least one latching lug against said detent notches;
        said adjusting means comprising a plurality of bias levels, disposed on said slide;
        each of said plurality of bias levels being disposed to generate a different bias of said at least one latching lug against said detent notches;
        said plurality of bias levels comprising a first biasing surface and a second biasing surface;
        said latching spring comprising a first projection and a second projection;
        said first and second projections being disposed opposite said latching lug;
        said first projection being disposed against said first biasing surface;
        said second projection being disposed against said second biasing surface;
    a first stop surface;
    a second stop surface;
    said first and second stop surfaces being disposed on said housing;
    a recess disposed between said first and second stop surfaces; and
    said latching spring being disposed within said recess.

2. The bicycle gear shifting system as claimed in claim 1 wherein:
    said latching spring has a first circumferential length;
    said latching spring has a flexed second circumferential length when said latching spring is disposed between ones of said plurality of detent notches;
    said second circumferential length is greater than said first circumferential length.

3. The bicycle gear shifting system as claimed in claim 2 wherein:
    said first biasing surface is of sufficient width to contain said first projection when said spring has said first circumferential length and when said spring has said second circumferential length; and
    said second biasing surface is of sufficient width to contain said second projection when said spring has said first circumferential length and when said spring has said second circumferential length.

4. The bicycle gear shifting system as claimed in claim 3 wherein:

said first biasing surface comprises a first means for providing a continuous change of the bias; and said second biasing surface comprises a second means for providing a continuous change of the bias.

5. The bicycle gear shifting system as claimed in claim 4 wherein at least one of said first and second continuous bias means an inclined plane.

6. The bicycle gear shifting system as claimed in claim 3 wherein at least one of said first and second biasing surfaces comprises a stepped surface.

7. A bicycle gear shifting system comprising:

a rotatable shift actuator for operating the gears of a bicycle;

said rotatable shift actuator comprising:
means for mounting said rotatable shift actuator on the bicycle handlebar generally coaxially with the handlebar; and
gear positions;

means for holding a chosen gear position and for resisting movement from one gear position to another gear position;

means for adjusting said gear position holding and resisting means to vary resistance to shifting;

said rotatable shift actuator comprising a housing;

said gear position holding and resisting means comprising:
a latching spring;
said latching spring including at least one latching lug;
a latching element for receiving said latching lug;
said latching element comprising a plurality of detent notches;
said latching element and said latching spring being rotatable with respect to each other; and
said at least one latching lug being disposed toward said detent notches;

said means for holding a chosen gear position and for resisting movement from one gear position to another gear position comprising:
a slide; and
said slide comprising means for biasing said at least one latching lug of said latching spring against said detent notches;

said adjusting and varying resistance means comprising a plurality of bias levels disposed on said slide;

each of said plurality of bias levels being disposed to generate a different bias of said at least one latching lug against said detent notches;

said plurality of bias levels comprising a first biasing surface and a second biasing surface;

said latching spring comprising:
a first projection and a second projection;
said first and second projections being disposed opposite said latching lug;
said first projection being disposed against said first biasing surface; and
said second projection being disposed against said second biasing surface;

means for limiting rotation of said latching spring;

said limiting rotation means comprising:
a first stop surface;
a second stop surface;
said first and second stop surfaces being disposed on said housing;
a recess being disposed between said first and second stop surfaces; and
said latching spring being disposed within said recess.

8. The bicycle gear shifting system as claimed in claim 7 wherein:

said latching spring has a first circumferential length said latching spring has a flexed second circumferential length when said latching lug is disposed between ones of said plurality of detent notches;

said second circumferential length being greater than said first circumferential length.

9. The bicycle gear shifting system as claimed in claim 8 wherein:

said first biasing surface is of sufficient width to contain said first projection when said spring has said first circumferential length and when said spring has said second circumferential length; and said second biasing surface is of sufficient length to contain said second projection when said spring has said first circumferential length and when said spring has said second circumferential length.

10. The bicycle gear shifting system as claimed in claim 9 wherein:

said first biasing surface comprises a first means for providing a continuous change of the bias; and said second biasing surface comprises a second means for providing a continuous change of the bias.

11. The bicycle gear shifting system as claimed in claim 10 wherein at least one of said first and second continuous bias means is an inclined plane.

* * * * *

UNITED STATES PATENT AND TRADEMARK OFFICE
CERTIFICATE OF CORRECTION

PATENT NO. : 5,666,859
DATED : September 16, 1997
INVENTOR(S) : Markus ARBEITER and Klaus NEUMANN It is certified that error appears in the above-identified patent and that said Letters Patent is hereby corrected as shown below:

In column 13, line 7, Claim 5, after 'means' insert --is--.

Signed and Sealed this

Twenty-fifth Day of August, 1998

Attest:

BRUCE LEHMAN

Attesting Officer

Commissioner of Patents and Trademarks